United States Patent
Strombach et al.

(10) Patent No.: US 12,179,299 B2
(45) Date of Patent: Dec. 31, 2024

(54) MACHINE TOOL WITH RECIRCULATING COOLANT FILTRATION SYSTEM

(71) Applicant: ILLINOIS TOOL WORKS INC., Glenview, IL (US)

(72) Inventors: Tony Emil Strombach, McHenry, IL (US); Roland Schaefer, Gurnee, IL (US); Bryan John Kordus, Twin Lakes, WI (US); Timothy Patrick Weber, Lake Zurich, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 983 days.

(21) Appl. No.: 16/502,199

(22) Filed: Jul. 3, 2019

(65) Prior Publication Data
US 2020/0047299 A1 Feb. 13, 2020

Related U.S. Application Data (60) Provisional application No. 62/715,547, filed on Aug. 7, 2018.

(51) Int. Cl.
*B23Q 11/00* (2006.01)
*B01D 29/03* (2006.01)
(Continued)

(52) U.S. Cl.
CPC .......... *B23Q 11/0003* (2013.01); *B01D 29/03* (2013.01); *B01D 29/72* (2013.01);
(Continued)

(58) Field of Classification Search
None
See application file for complete search history.

(56) References Cited

U.S. PATENT DOCUMENTS

| | | | |
|---|---|---|---|
| 767,210 A * | 8/1904 | Dietrich | C02F 1/004 210/129 |
| 1,917,831 A * | 7/1933 | Fairbairn | B23Q 11/0057 29/DIG. 98 |

(Continued)

FOREIGN PATENT DOCUMENTS

| | | |
|---|---|---|
| DE | 3633110 | 3/1988 |
| EP | 0881033 | 12/1998 |

(Continued)

OTHER PUBLICATIONS

International Searching Authority; "International Search Report and Written Opinion," issued in connection with International Patent Application No. PCT/US2019/045490, mailed Nov. 7, 2019, 33 pages.

*Primary Examiner* — Robert J Popovics
(74) *Attorney, Agent, or Firm* — McAndrews, Held & Malloy, Ltd.

(57) ABSTRACT

Apparatus, systems, and/or methods for filtering, recapture, and/or recirculation of coolant are disclosed. In some examples, coolant (e.g., coolant fluid) is used to cool and/or clean a machine, such as a material removal machine, for example. In some examples, a recirculation tank may be in fluid communication with an inlet and/or outlet of a cabinet (and/or housing) of the machine. The recirculation tank may include a recapture reservoir having a filtering surface configured to prevent particulates, debris, and/or swarf from being recirculated with the coolant. A vibration device (e.g., a vibration motor and/or vibrating actuator), may be in contact with and/or configured to vibrate (and/or shake, rattle, oscillate, etc.) the filtering surface, recapture reservoir, and/or recirculation tank so as to keep the filter free (Continued)

from obstruction and/or help settle and/or compact filtered particulates in a bottom of the recapture reservoir and/or recirculation tank.

14 Claims, 6 Drawing Sheets

(51) Int. Cl.
    *B01D 29/72*     (2006.01)
    *B01D 35/20*     (2006.01)
    *B23D 59/02*     (2006.01)
    *B23D 59/04*     (2006.01)
    *B23Q 11/10*     (2006.01)
    *B23Q 11/12*     (2006.01)
    *B24B 55/03*     (2006.01)

(52) U.S. Cl.
    CPC ........... *B01D 35/20* (2013.01); *B23D 59/025* (2013.01); *B23Q 11/10* (2013.01); *B23Q 11/1069* (2013.01); *B23Q 11/126* (2013.01); *B24B 55/03* (2013.01); *B23D 59/04* (2013.01)

(56) References Cited

U.S. PATENT DOCUMENTS

| | | | | | |
|---|---|---|---|---|---|
| 2,140,289 | A | * | 12/1938 | Hurtt | B21B 45/0218 72/46 |
| 2,142,726 | A | * | 1/1939 | Hetzer | C07C 17/38 203/41 |
| 2,306,986 | A | * | 12/1942 | Tolman | B01D 39/2003 210/486 |
| 2,401,340 | A | * | 6/1946 | Dunmire | C10M 175/04 210/167.04 |
| 2,426,817 | A | * | 9/1947 | Charlton | B23Q 11/141 184/6.24 |
| 2,434,679 | A | * | 1/1948 | Wagner | B24B 55/02 451/7 |
| 2,434,750 | A | * | 1/1948 | Trecker | B23C 1/00 409/137 |
| 2,477,404 | A | * | 7/1949 | Butt, Jr. | B01D 29/055 210/DIG. 8 |
| 2,482,302 | A | * | 9/1949 | Summers | B01D 29/56 210/335 |
| 2,595,559 | A | * | 5/1952 | Alvord | B24B 55/02 451/450 |
| 2,675,012 | A | * | 4/1954 | Scales | B08B 3/006 134/91 |
| 2,895,883 | A | * | 7/1959 | Hobson | F16N 39/06 494/35 |
| 3,160,587 | A | * | 12/1964 | Waring | B24B 55/06 210/167.02 |
| 3,341,983 | A | * | 9/1967 | Baldenhofer | B23Q 11/1069 210/512.1 |
| 3,430,767 | A | * | 3/1969 | Kenneth | B23Q 11/0042 210/167.01 |
| 3,455,457 | A | * | 7/1969 | Popelar | B01D 21/12 210/167.04 |
| 3,518,917 | A | * | 7/1970 | Sluhan | B23Q 11/1061 408/56 |
| 3,533,327 | A | * | 10/1970 | Hagerty | B23Q 11/0046 55/432 |
| 3,599,795 | A | * | 8/1971 | Worlidge | B01D 33/327 210/526 |
| 3,605,551 | A | * | 9/1971 | Steward | B23P 25/00 83/171 |
| 3,618,707 | A | * | 11/1971 | Sluhan | B23Q 11/1069 184/6.14 |
| 3,708,977 | A | * | 1/1973 | Raymond | F15B 1/26 60/916 |
| 3,750,847 | A | * | 8/1973 | Sluhan | B26D 7/088 184/6.14 |
| 3,823,823 | A | * | 7/1974 | Dokter | B01D 29/01 210/791 |
| 3,844,269 | A | * | 10/1974 | Rater | B23D 47/047 125/35 |
| 3,897,335 | A | * | 7/1975 | Brandt | C10M 175/04 210/776 |
| 3,954,611 | A | * | 5/1976 | Reedy | F16N 39/00 210/182 |
| 3,960,728 | A | * | 6/1976 | Otzen | B01D 29/27 210/167.01 |
| 4,056,114 | A | * | 11/1977 | Boutillette | B08B 3/006 134/104.4 |
| 4,076,442 | A | * | 2/1978 | Cox, Jr. | B23Q 11/1038 408/11 |
| 4,082,014 | A | * | 4/1978 | Idel | B23D 63/12 451/21 |
| 4,122,008 | A | * | 10/1978 | Allen | B01D 39/1623 210/197 |
| 4,139,464 | A | * | 2/1979 | Coward | F16N 31/00 210/197 |
| 4,325,663 | A | * | 4/1982 | Lee | B23Q 11/1069 210/167.04 |
| 4,361,488 | A | * | 11/1982 | White | C23G 1/36 210/167.04 |
| 4,440,642 | A | * | 4/1984 | Frese | B23Q 11/1069 210/387 |
| 4,501,949 | A | * | 2/1985 | Antol | B23K 26/123 219/121.77 |
| 4,518,843 | A | * | 5/1985 | Antol | B23K 26/127 219/121.84 |
| 4,618,431 | A | * | 10/1986 | Hindman | B01D 35/157 210/791 |
| 4,628,170 | A | * | 12/1986 | Furukawa | B23H 1/10 210/126 |
| 4,651,472 | A | * | 3/1987 | Scheder | B24B 49/04 451/244 |
| 4,655,940 | A | * | 4/1987 | Harms | B23Q 11/10 210/167.01 |
| 4,685,361 | A | * | 8/1987 | Myers | B23Q 11/0042 198/860.3 |
| 4,708,539 | A | * | 11/1987 | Threadgill | B23Q 11/1084 82/904 |
| 4,715,964 | A | * | 12/1987 | Harms | B01D 29/09 210/387 |
| 4,733,999 | A | * | 3/1988 | Kitamura | B23Q 11/1069 82/149 |
| 4,751,006 | A | * | 6/1988 | Becker | B01D 21/009 210/387 |
| 4,772,402 | A | * | 9/1988 | Love | B01D 36/02 210/313 |
| 4,802,311 | A | * | 2/1989 | Scheder | B23Q 17/20 451/22 |
| 4,872,997 | A | * | 10/1989 | Becker | B01D 17/0205 210/171 |
| 4,952,317 | A | * | 8/1990 | Culkin | B01D 63/16 210/636 |
| 4,955,770 | A | * | 9/1990 | Kitamura | B23Q 11/0875 409/137 |
| 4,992,167 | A | * | 2/1991 | Uchiyama | B01D 33/76 210/402 |
| 5,071,567 | A | * | 12/1991 | Corcelle | B23H 1/10 210/791 |
| 5,078,256 | A | * | 1/1992 | Hatano | B23Q 3/15513 409/137 |
| 5,084,176 | A | * | 1/1992 | Davis | B01D 33/0315 209/381 |
| 5,086,795 | A | * | 2/1992 | Harms | B23Q 11/10 210/171 |
| 5,099,729 | A | * | 3/1992 | Miyano | B23B 3/06 451/388 |
| 5,113,558 | A | * | 5/1992 | Soroka | B23Q 11/128 409/137 |
| 5,124,736 | A | * | 6/1992 | Yamamoto | G03F 7/30 396/617 |
| 5,167,839 | A | * | 12/1992 | Widmer, II | B01D 21/2455 198/716 |

(56) References Cited

U.S. PATENT DOCUMENTS

| | | | | |
|---|---|---|---|---|
| 5,205,686 A | * | 4/1993 | de Caussin | B23Q 11/0057 409/137 |
| 5,223,156 A | * | 6/1993 | Maier | B28D 1/025 210/167.01 |
| 5,224,051 A | * | 6/1993 | Johnson | B23Q 11/1061 700/169 |
| 5,230,793 A | * | 7/1993 | Lenhart | B01D 35/12 184/6.24 |
| 5,244,586 A | * | 9/1993 | Hawkins | B01D 36/045 210/776 |
| 5,262,071 A | * | 11/1993 | Tuck | B23Q 11/1046 210/171 |
| 5,298,161 A | * | 3/1994 | Sieg | B23H 1/10 210/411 |
| 5,300,220 A | * | 4/1994 | McEwen | B23Q 11/0057 210/167.01 |
| 5,380,446 A | * | 1/1995 | Bratten | B23Q 11/1069 184/6.24 |
| 5,395,537 A | * | 3/1995 | Ellison | B01D 36/045 210/295 |
| 5,399,262 A | * | 3/1995 | Hawkins | B01D 36/02 210/313 |
| 5,417,849 A | * | 5/1995 | McEwen | B01D 33/807 210/167.04 |
| 5,417,851 A | * | 5/1995 | Yee | B01D 29/96 210/167.01 |
| 5,445,738 A | * | 8/1995 | Fry | B01D 33/0315 210/384 |
| 5,456,147 A | * | 10/1995 | Stange, Jr. | B23D 59/001 83/412 |
| 5,458,770 A | * | 10/1995 | Fentz | B01D 17/0211 210/171 |
| 5,466,380 A | * | 11/1995 | Bratten | B01D 37/045 409/137 |
| 5,471,897 A | * | 12/1995 | Wright | B23D 63/003 76/43 |
| 5,499,643 A | * | 3/1996 | Vincent, Jr. | B08B 3/006 134/155 |
| 5,501,741 A | * | 3/1996 | McMahon | B01D 61/145 134/13 |
| 5,575,307 A | * | 11/1996 | Martinitz | B23Q 11/0057 210/167.02 |
| 5,582,740 A | * | 12/1996 | McEwen | B01D 33/74 210/167.04 |
| 5,593,596 A | * | 1/1997 | Bratten | B01D 37/00 409/137 |
| 5,595,462 A | * | 1/1997 | Hensley | B23Q 1/0036 408/1 R |
| 5,645,382 A | * | 7/1997 | Homanick | B23P 25/00 409/137 |
| 5,662,812 A | * | 9/1997 | McEwen | B23Q 11/0057 210/167.01 |
| 5,772,871 A | * | 6/1998 | Lyon | B01D 17/12 210/DIG. 5 |
| 5,772,900 A | * | 6/1998 | Yorita | B01D 37/046 210/167.04 |
| 5,782,673 A | * | 7/1998 | Warehime | B24C 5/02 451/36 |
| 5,799,643 A | * | 9/1998 | Miyata | B28D 1/025 451/60 |
| 5,800,104 A | * | 9/1998 | Miyano | B01D 21/32 409/137 |
| 5,857,815 A | * | 1/1999 | Bailey | F16C 11/06 901/29 |
| 5,858,218 A | * | 1/1999 | Setlock | B01D 29/945 210/197 |
| 5,972,209 A | * | 10/1999 | Shih | B01D 17/0214 210/171 |
| 5,972,230 A | * | 10/1999 | Ely | B01D 29/62 134/22.16 |
| 5,975,108 A | * | 11/1999 | Cho | H01L 21/67017 137/205 |
| 5,980,735 A | * | 11/1999 | Bratten | B23Q 11/0053 210/167.01 |
| 5,983,910 A | * | 11/1999 | Berger | B01D 17/00 134/115 R |
| 6,012,965 A | * | 1/2000 | Savoie | B29D 11/00961 451/384 |
| 6,017,446 A | * | 1/2000 | Harms | B23Q 11/1069 210/194 |
| 6,027,658 A | * | 2/2000 | Soble | B01D 21/2483 210/801 |
| 6,053,158 A | * | 4/2000 | Miyata | B28D 1/025 451/60 |
| 6,071,047 A | * | 6/2000 | Nakai | B01D 17/00 409/137 |
| 6,096,198 A | * | 8/2000 | Underhill | B01D 17/0214 210/123 |
| 6,110,386 A | * | 8/2000 | Underhill | B23Q 11/1069 261/119.1 |
| 6,116,616 A | * | 9/2000 | Bratten | B23Q 11/10 409/134 |
| 6,125,883 A | * | 10/2000 | Creps | F04D 7/045 137/574 |
| 6,126,099 A | * | 10/2000 | Fachinger | B23Q 11/1069 409/137 |
| 6,126,336 A | * | 10/2000 | Ferrante | G03F 7/30 210/197 |
| 6,162,355 A | * | 12/2000 | Mizuno | B01D 21/26 210/512.1 |
| 6,206,055 B1 | * | 3/2001 | Hollub | B60T 17/222 141/98 |
| 6,224,273 B1 | * | 5/2001 | Ferrante | G03F 7/3092 396/617 |
| 6,241,432 B1 | * | 6/2001 | Sasanecki | B23Q 11/1084 137/884 |
| 6,302,167 B1 | * | 10/2001 | Hollub | B60T 17/221 141/98 |
| 6,322,694 B1 | * | 11/2001 | Iliadis | B01D 17/10 210/167.01 |
| 6,338,795 B1 | * | 1/2002 | Okajima | B01D 21/0042 210/167.04 |
| 6,379,538 B1 | * | 4/2002 | Corlett | C02F 1/006 210/418 |
| 6,382,887 B1 | * | 5/2002 | Nakai | B23Q 11/0858 210/171 |
| 6,383,057 B1 | * | 5/2002 | Bartlett | B23Q 11/08 977/890 |
| 6,406,635 B1 | * | 6/2002 | Smith | B23Q 11/1069 210/167.04 |
| 6,425,715 B1 | * | 7/2002 | Sasanecki | B23Q 11/1084 408/56 |
| 6,435,198 B2 | * | 8/2002 | Berger | B01D 17/085 134/110 |
| 6,445,971 B1 | * | 9/2002 | Gottschalk | B23Q 1/66 483/1 |
| 6,461,523 B1 | * | 10/2002 | Greenrose | B01D 29/94 210/780 |
| 6,482,325 B1 | * | 11/2002 | Corlett | C02F 1/463 451/60 |
| 6,485,634 B2 | * | 11/2002 | Warren | B03C 1/12 210/85 |
| 6,495,031 B1 | * | 12/2002 | Bratten | B01D 29/6423 210/392 |
| 6,508,692 B2 | * | 1/2003 | Gottschalk | B24B 47/22 451/5 |
| 6,508,944 B1 | * | 1/2003 | Bratten | B23Q 11/1069 210/167.01 |
| 6,571,959 B1 | * | 6/2003 | Moore | B01D 33/37 210/402 |
| 6,655,245 B2 | * | 12/2003 | Schuettel | B23Q 11/141 82/1.11 |
| 6,656,359 B1 | * | 12/2003 | Osuda | B24B 55/12 210/639 |
| 6,662,685 B2 | * | 12/2003 | Kuriki | B23Q 11/08 277/645 |
| 6,708,737 B1 | * | 3/2004 | Bratten | B23Q 11/005 141/286 |

(56) References Cited

U.S. PATENT DOCUMENTS

| | | | | |
|---|---|---|---|---|
| 6,746,309 B2* | 6/2004 | Tsuihiji | ................... | B01D 29/56 451/28 |
| 6,890,242 B2* | 5/2005 | Tsuihiji | ................... | B01D 29/70 451/28 |
| 6,911,142 B2* | 6/2005 | Pahl | ................... | B23Q 11/0057 210/167.01 |
| 6,938,633 B2* | 9/2005 | Sugata | ................ | B23Q 11/1076 210/418 |
| 6,977,037 B2* | 12/2005 | Mioc | ................... | B23Q 11/0057 210/473 |
| 7,014,760 B2* | 3/2006 | Ackermanns | ........ | B01D 33/801 210/402 |
| 7,018,528 B2* | 3/2006 | Lee | ......................... | B01D 17/00 210/232 |
| 7,044,693 B2* | 5/2006 | Fujiwara | ............ | B23Q 11/0053 409/137 |
| 7,052,599 B2* | 5/2006 | Osuda | ..................... | B24B 37/04 451/60 |
| 7,074,338 B2* | 7/2006 | Mizuno | ................... | B01D 29/15 210/791 |
| 7,077,954 B2* | 7/2006 | Bratten | ................... | F04D 7/045 210/167.29 |
| 7,165,919 B2* | 1/2007 | Schweizer | ............ | B23Q 1/015 82/149 |
| 7,172,689 B2* | 2/2007 | Bratten | .............. | B23Q 11/0057 210/167.02 |
| 7,179,372 B2* | 2/2007 | Miller | .................... | B01D 29/56 210/255 |
| 7,241,090 B2* | 7/2007 | Reynders | ........... | B23Q 11/0067 409/137 |
| 7,258,784 B2* | 8/2007 | O'Ryan | ............. | B01D 39/1661 210/108 |
| 7,297,278 B2* | 11/2007 | Steele | .................. | B01D 61/147 210/705 |
| 7,314,547 B2* | 1/2008 | Stinson | .................. | B01D 36/02 210/287 |
| 7,338,606 B2* | 3/2008 | Bratten | .............. | B23Q 11/0057 210/741 |
| 7,341,659 B2* | 3/2008 | Streicher | .............. | B23Q 11/006 210/167.01 |
| 7,364,663 B2* | 4/2008 | Larson | ................. | B01D 17/045 210/DIG. 5 |
| 7,381,323 B2* | 6/2008 | Umezawa | ............ | B01D 29/114 210/791 |
| 7,387,478 B2* | 6/2008 | Anderson | .......... | B23Q 11/0067 409/134 |
| 7,410,569 B1* | 8/2008 | Tilev | .................. | B01D 21/0012 210/411 |
| 7,648,632 B2* | 1/2010 | Ackermanns | ...... | B23Q 11/1069 210/402 |
| 7,748,373 B2* | 7/2010 | Toncelli | ................. | B28D 1/043 125/35 |
| 7,775,854 B1* | 8/2010 | Boman | .................. | B24C 9/006 451/88 |
| 7,824,547 B2* | 11/2010 | Reynders | ............... | B01D 29/09 210/171 |
| 7,976,704 B2* | 7/2011 | Tashiro | ................... | B03C 1/288 210/695 |
| 7,981,293 B2* | 7/2011 | Powell | ................... | B01D 61/18 210/534 |
| 8,029,670 B2* | 10/2011 | Dietenhauser | ......... | B01D 33/41 210/406 |
| 8,113,099 B2* | 2/2012 | Lihl | ......................... | G01N 1/06 83/915.5 |
| 8,157,992 B2* | 4/2012 | Konig | ................... | B01D 65/02 210/167.04 |
| 8,192,617 B2* | 6/2012 | Powell | .................... | C02F 9/00 210/197 |
| 8,361,313 B2* | 1/2013 | Pancaldi | ................ | B01D 29/72 210/167.04 |
| 8,747,666 B2* | 6/2014 | Miller | .................... | C02F 1/444 210/255 |
| 8,875,537 B1* | 11/2014 | Utathin | ............. | H01L 21/67109 62/373 |
| 8,894,852 B2* | 11/2014 | Urban | .................... | B01D 21/30 210/220 |
| 8,926,837 B1* | 1/2015 | Shumate | ............. | A47J 37/1223 210/DIG. 8 |
| 8,960,177 B2* | 2/2015 | Grumbine | ............ | C09K 3/1463 125/16.02 |
| 8,986,538 B2* | 3/2015 | Ishihara | ............... | B01D 29/605 210/139 |
| 9,132,455 B2* | 9/2015 | Marks | ................... | D06F 39/083 |
| 9,168,674 B2* | 10/2015 | Walker | .................... | B28D 7/02 |
| 9,186,606 B2* | 11/2015 | Ishihara | ............... | B23Q 11/1069 |
| 9,255,024 B2* | 2/2016 | Urban | ........................ | C02F 1/40 |
| 9,315,407 B2* | 4/2016 | Urban | ........................ | C02F 1/42 |
| 9,393,571 B2* | 7/2016 | Hori | ......................... | B03C 1/30 |
| 9,757,667 B1* | 9/2017 | Bigos | ................... | B01D 21/262 |
| 9,802,337 B2* | 10/2017 | Nagai | ..................... | B28D 5/007 |
| 9,856,151 B2* | 1/2018 | Haberman | ............ | C02F 1/529 |
| 9,969,104 B2* | 5/2018 | Sever | ................... | G05D 7/0676 |
| 10,059,021 B2* | 8/2018 | Deng | .................... | B26D 7/088 |
| 10,071,454 B2 | 9/2018 | Forlong | | |
| 10,081,116 B2* | 9/2018 | Adair | ................... | B23D 47/12 |
| 10,112,136 B2* | 10/2018 | Morris | ................ | B23Q 11/0067 |
| 10,266,789 B2* | 4/2019 | Tanaka | ...................... | B21C 9/00 |
| 10,364,180 B2* | 7/2019 | Chen | ...................... | C03C 15/00 |
| 10,414,008 B2* | 9/2019 | Takakuwa | ............ | B23Q 11/1061 |
| 10,493,384 B2* | 12/2019 | McVicker | ............ | B01D 24/165 |
| 10,532,415 B2* | 1/2020 | Kordus | .................. | B28D 5/024 |
| 10,695,882 B2* | 6/2020 | Fujii | ...................... | G05B 19/404 |
| 10,745,299 B2* | 8/2020 | Powell | ..................... | C02F 1/463 |
| 10,787,346 B1* | 9/2020 | Yu | ........................ | B23Q 11/0046 |
| 10,794,264 B2* | 10/2020 | Nakayama | ........... | F01P 11/0276 |
| 10,940,601 B2* | 3/2021 | Adair | .................... | B23D 47/12 |
| 11,179,789 B2* | 11/2021 | Uneda | ...................... | B23H 1/10 |
| 11,511,381 B2* | 11/2022 | Ceckowski | ........... | B23D 59/006 |
| 11,628,386 B2* | 4/2023 | Tashiro | ................. | B01D 33/073 210/784 |
| 11,897,084 B2* | 2/2024 | Kordus | ................. | B24B 27/0084 |
| 2002/0081167 A1* | 6/2002 | Sasanecki | ............ | B23Q 1/0018 137/884 |
| 2003/0021647 A1* | 1/2003 | Groitl | ..................... | B23Q 1/015 409/137 |
| 2003/0057145 A1 | 3/2003 | Jensen | | |
| 2003/0183562 A1* | 10/2003 | Pahl | ................... | B23Q 11/0057 409/137 |
| 2004/0047700 A1* | 3/2004 | Maeda | ............... | B23Q 11/0891 409/137 |
| 2004/0065384 A1* | 4/2004 | Bratten | ................ | B23Q 11/005 141/86 |
| 2004/0159597 A1* | 8/2004 | Lee | .................... | B01D 17/0208 210/167.29 |
| 2004/0262209 A1* | 12/2004 | Umezawa | ............... | B01D 29/66 210/216 |
| 2005/0103695 A1* | 5/2005 | Mioc | ................... | B23Q 11/0057 210/167.01 |
| 2005/0167373 A1* | 8/2005 | Pancaldi | ............ | B01D 29/6438 210/791 |
| 2006/0045641 A1* | 3/2006 | Anderson | ......... | B23Q 11/0067 74/609 |
| 2006/0060545 A1* | 3/2006 | Bratten | ............... | B23Q 11/0057 210/805 |
| 2006/0207927 A1* | 9/2006 | Tirakian | .................. | B24C 9/006 210/416.1 |
| 2006/0266685 A1* | 11/2006 | Umezawa | ................ | B01D 37/02 210/216 |
| 2006/0266686 A1* | 11/2006 | Umezawa | ................ | B01D 37/02 210/216 |
| 2006/0266687 A1* | 11/2006 | Umezawa | ................ | B01D 63/089 210/791 |
| 2007/0007216 A1* | 1/2007 | Bratten | ............... | B23Q 11/1069 210/741 |
| 2008/0078726 A1* | 4/2008 | Pancaldi | ................. | B01D 29/94 210/415 |
| 2008/0087333 A1* | 4/2008 | Pfeiffer | .................... | E21B 21/01 137/547 |

(56) References Cited

U.S. PATENT DOCUMENTS

| | | | | |
|---|---|---|---|---|
| 2008/0283475 | A1* | 11/2008 | Benty | B01D 21/0012 |
| | | | | 210/801 |
| 2011/0186503 | A1* | 8/2011 | Holzmeier | B01D 21/0012 |
| | | | | 210/435 |
| 2011/0192803 | A1* | 8/2011 | Holzmeier | B28D 7/02 |
| | | | | 210/741 |
| 2013/0199987 | A1* | 8/2013 | Morris | B23Q 11/1069 |
| | | | | 210/323.1 |
| 2013/0319919 | A1* | 12/2013 | Ishihara | B23Q 11/1069 |
| | | | | 210/104 |
| 2014/0102964 | A1* | 4/2014 | Ishihara | B23Q 11/1069 |
| | | | | 210/140 |
| 2014/0116930 | A1* | 5/2014 | Hori | B03C 1/30 |
| | | | | 210/167.01 |
| 2014/0124418 | A1* | 5/2014 | Ishihara | B01D 29/66 |
| | | | | 210/86 |
| 2014/0291228 | A1* | 10/2014 | Ishihara | B23Q 11/1069 |
| | | | | 210/257.1 |
| 2015/0217472 | A1* | 8/2015 | Adair | B26D 1/12 |
| | | | | 83/72 |
| 2016/0144296 | A1* | 5/2016 | McVicker | B01D 24/02 |
| | | | | 210/807 |
| 2017/0129138 | A1* | 5/2017 | Sever | B28D 7/005 |
| 2017/0369362 | A1* | 12/2017 | Chen | C03C 15/00 |
| 2019/0001518 | A1* | 1/2019 | Adair | B26D 1/12 |
| 2019/0060804 | A1* | 2/2019 | Morris | B23Q 11/0067 |
| 2019/0118324 | A1* | 4/2019 | Fujii | B23Q 11/0075 |
| 2019/0262917 | A1* | 8/2019 | Kordus | B24B 49/18 |
| 2020/0047299 | A1* | 2/2020 | Strombach | B23Q 11/0003 |
| 2020/0070266 | A1* | 3/2020 | Kordus | F16B 39/284 |
| 2020/0070294 | A1* | 3/2020 | Ceckowski | G05B 19/404 |
| 2020/0072324 | A1* | 3/2020 | Kordus | F16H 7/08 |
| 2020/0078894 | A1* | 3/2020 | Noake | B23Q 11/0067 |
| 2020/0078902 | A1* | 3/2020 | Kordus | B24B 3/343 |
| 2020/0122282 | A1* | 4/2020 | Kobayashi | B01D 21/003 |
| 2020/0179842 | A1* | 6/2020 | Nishizawa | B01D 35/143 |
| 2020/0290139 | A1* | 9/2020 | Kordus | B23D 59/02 |
| 2021/0129157 | A1* | 5/2021 | Weppelmann | B03C 1/286 |
| 2022/0111307 | A1* | 4/2022 | Lanzrath | B01F 27/112 |
| 2022/0126418 | A1* | 4/2022 | Schaefer | B24B 49/12 |
| 2023/0047592 | A1* | 2/2023 | Ceckowski | B23Q 15/12 |
| 2023/0311221 | A1* | 10/2023 | Zhao | B23D 59/02 |
| | | | | 83/169 |
| 2023/0320529 | A1* | 10/2023 | Sul | A47J 37/1285 |
| | | | | 99/403 |
| 2024/0082972 | A1* | 3/2024 | Kohler | B23Q 11/0067 |

FOREIGN PATENT DOCUMENTS

| | | | |
|---|---|---|---|
| JP | 2010058083 | 3/2010 | |
| WO | 2013021410 | 2/2013 | |
| WO | WO-2014028664 A2 * | 2/2014 | B23D 47/12 |
| WO | WO-2020033535 A1 * | 2/2020 | B01D 29/03 |
| WO | WO-2022056723 A1 * | 3/2022 | B23D 59/02 |

* cited by examiner

MACHINE TOOL WITH RECIRCULATING COOLANT FILTRATION SYSTEM

CROSS REFERENCE TO RELATED APPLICATIONS

This application claims priority from, and the benefit of, U.S. Provisional Application Ser. No. 62/715,547, entitled "COOLANT RECAPTURE AND RECIRCULATION IN MATERIAL REMOVAL SYSTEMS," filed Aug. 7, 2018, the entirety of which is hereby incorporated by reference.

TECHNICAL FIELD

The present disclosure generally relates to fluid filtering and, more particularly, to coolant recapture and/or recirculation in material removal systems.

BACKGROUND

Conventional material removal machines, such as saws, grinders, polishers, and/or more general material preparation and/or testing machines, for example, produce debris and/or swarf during preparation and/or testing. Additionally, the material removal machines may produce heat due to friction, movement, electricity, etc. Some material removal machines use coolant to wash away the debris and/or swarf, as well as to cool the material removal machine.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to coolant fluid recapture, recirculation, and/or filtering in material removal systems, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As used herein, the terms "e.g.," and "for example" set off lists of one or more non-limiting examples, instances, or illustrations.

As used herein, the term "fluid," when used as a noun, refers to a free-flowing deformable substance with no fixed shape, including, inter alia, gas (e.g., air, atmosphere, etc.), liquid (e.g., water, solution, etc), and/or plasma.

Some examples of the present disclosure relate to a material removal system, comprising a material removal cabinet having a cabinet inlet and a cabinet outlet, and a recirculation system in fluid communication with the cabinet inlet and cabinet outlet, the recirculation system, comprising a recirculation tank, and a vibration device configured to vibrate at least a portion of the recirculation system, so as to reduce obstruction of the recirculation system or increase compaction of within the recirculation system.

In some examples, the recirculation system further comprises a filtering surface configured to filter fluid within the recirculation system. In some examples, the recirculation tank is in fluid communication with the cabinet inlet, and the recirculation system further comprises a recapture reservoir in fluid communication with the cabinet outlet and the recirculation tank, the filtering surface configured to filter fluid flowing between the recapture reservoir to the recirculation tank. In some examples, the filtering surface has openings sized to prevent passage of debris to the recirculation tank. In some examples, the recapture reservoir is positioned at least partly within the recirculation tank. In some examples, the recapture reservoir further including a removable cover. In some examples, the recapture reservoir comprises a container having a top, a bottom, and a porous sidewall between the top and the bottom.

Some examples of the present disclosure relate to a recirculation apparatus, comprising a recirculation tank, a recapture reservoir in fluid communication with the recirculation tank, a filtering surface configured to filter fluid communicated between the recapture reservoir and the recirculation tank, the filtering surface comprising openings sized to prohibit passage of particulates between the recapture reservoir and the recirculation tank, and a vibration device configured to vibrate one or more of the recirculation tank, the recapture reservoir, and the filtering surface, so as to reduce obstruction of the filtering surface or increase compaction of filtered particulates.

In some examples, the recapture reservoir further includes a removable cover. In some examples, the recapture reservoir comprises a container having a top, a bottom, and a sidewall connected to the bottom, the top comprising the removable cover. In some examples, the recapture reservoir comprises a container having a top, a bottom, and a porous sidewall between the top and the bottom. In some examples, the apparatus further comprises a support connecting the recapture reservoir to the recirculation tank. In some examples, the vibration device is in contact with the support. In some examples, the apparatus further comprises a dampener positioned between the support and the recapture reservoir, the dampener configured to reduce noise created by vibrations communicated between the support and the recapture reservoir.

Some examples of the present disclosure relate to a method for recirculating coolant, comprising routing a coolant from a material removal cabinet to a recirculation system, vibrating the recirculation system so as to increase compaction of particulates within the recirculation system, and routing the coolant from the recirculation system to the material removal cabinet.

In some examples, the recirculation system comprises a recirculation tank in fluid communication with the material removal cabinet. In some examples, the recirculation system further comprises a filtering surface configured to filter fluid flow within the recirculation system, and vibrating the recirculation system further reduces obstruction of the filtering surface. In some examples, the recirculation tank is in fluid communication with an inlet of the material removal cabinet, and the recirculation system further comprises a recapture reservoir in fluid communication with the recirculation tank and an outlet of the material removal cabinet, the filtering surface configured to filter fluid flow between the recapture reservoir and the recirculation tank. In some examples, the material removal cabinet includes a material removal machine configured to remove material from a sample. In some examples, the material removal machine includes a saw, a polisher, or a grinder.

Some examples of the present disclosure relate to the recapture, recirculation, filtering, and/or recycling of coolant, and in particular coolant fluid used to cool and/or clean a machine, such as a material removal machine. In some examples, a recirculation tank recirculates and/or recycles the coolant. The recirculation tank is in fluid communication with an inlet and/or outlet of a cabinet (and/or housing or other delivery and/or capture system) of the machine, so as to receive the coolant from the cabinet and/or deliver recycled coolant back to the cabinet. The recirculation tank may include a recapture reservoir having a filtering surface configured to prevent debris and/or swarf (such as produced by the machine, for example) from entering the recirculation tank and/or being recirculated with the coolant. A vibration device (e.g., a vibration motor and/or vibrating actuator), may be in contact with and/or configured to vibrate (and/or shake, rattle, oscillate, etc.) the recapture reservoir, the recirculation tank, and/or the filtering surface so as to dislodge any particulates that may get stuck in the filter and/or help to settle and/or compact filtered particulates to the bottom of the recapture reservoir (and/or recirculation tank) from where the particulates may be more easily removed.

The positioning, orientation, and/or vibration of the filtering surface may help to keep the filtering surface free from obstruction, so that coolant may continue move through the recapture reservoir to the recirculation tank for recirculation. The filtering surface may have relatively small openings, so as to prevent passage of particulates. Whereas more conventional filters with small openings may get clogged easily and/or frequently, necessitating frequent replacement and/or cleaning, the positioning, orientation, and/or vibration of the filtering surface substantially reduces clogging and/or obstruction. Thus, the required frequency of cleaning and/or replacement is reduced. Additionally, the vibration helps to settle and/or compact filtered particulates to the bottom of the recapture reservoir (and/or recirculation tank) where the particulates may be more easily removed.

Figure 1:
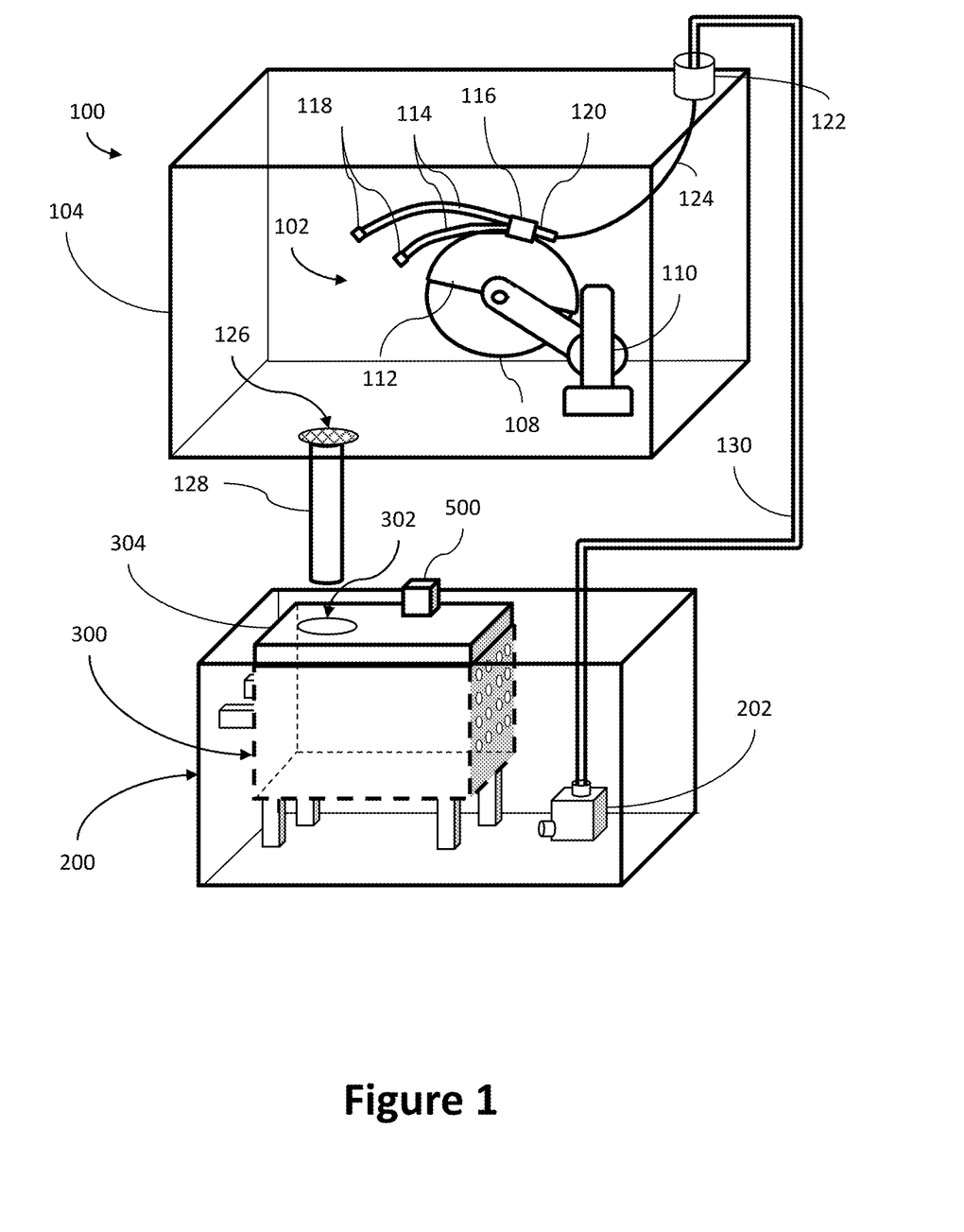
FIG. 1 shows an example material removal system, in accordance with aspects of this disclosure.

FIG. 1 shows an example material removal system 100. In the example of FIG. 1, the material removal system 100 includes a material removal machine 102 enclosed in a cabinet 104 and a recirculation tank 200 in fluid communication with the cabinet 104. As shown, the cabinet 104 is approximately cubical, though, in some examples, the cabinet 104 may take a variety of other shapes. In the example of FIG. 1, the material removal machine 102 includes a material removal instrument 108, such as a saw blade, abrasive saw, grinder, polisher, and/or some other material removal instrument, for example. In the example of FIG. 1, the material removal instrument 108 is secured to a support assembly 110 within the cabinet 104. The material removal instrument 108 is also partially encased within a shield 112. As shown, the shield 112 is attached to a cooling system.

In the example of FIG. 1, the cooling system includes several coolant hoses 114 attached to the shield 112 through a manifold 116. Each hose 114 terminates in a nozzle 118. The nozzles 118 are configured to spray (and/or otherwise provide) coolant into the cabinet 104. For example, the nozzles 118 may introduce coolant to the machine 102, a sample and/or workpiece (not shown), a table (not shown), and/or other components of the material removal system 100. In the example of FIG. 1, the hoses 114 are configured to receive coolant from a hose inlet 120 that is also attached to the manifold 116. The hose inlet 120 is in fluid communication with a cabinet inlet 122 through a coolant tube 124. As shown, the coolant tube 124 is configured to route coolant from the cabinet inlet 122, through the coolant tube 124 to the hose inlet 120. The hoses 114 are configured to route the coolant to their respective nozzles 118 and spray the coolant into the cabinet 104. The coolant introduced by the nozzles 118 may serve to cool and/or clean the material removal machine 102 and/or other components of the material removal system 100, while also removing debris and/or swarf from the cabinet 104.

In some examples, the hose inlet 120 may not be attached to the manifold 116. In some examples, there may be more than one manifold 116, hose inlet 120, tube 124, and/or cabinet inlet 122. In some examples, there may be more or less than two hoses 114 and/or nozzles 118. In some examples, one or more fluid actuators (e.g., pumps) may be used to propel the coolant through the tube 124, hose inlet 120, hoses 114, and/or nozzles 118.

In the example of FIG. 1, the cabinet 104 further includes a cabinet outlet 126 (and/or drain). As shown, the cabinet outlet 126 comprises a porous sieve (and/or mesh, filter, screen, etc.) configured to allow coolant to pass while prohibiting larger particulate matter (e.g., dislodged, freed, and/or unattached components of the material removal machine 102) from passing. In some examples, the cabinet outlet 126 may omit the sieve, and may simply comprise an opening. In the example of FIG. 1, the cabinet outlet 126 is in fluid communication with a drain pipe 128 that leads to a coolant recirculation tank 200. While the drain pipe 128 is shown as being straight, in some examples the drain pipe 128 may be curved and/or include one or more appropriate drain pipe devices, such as a P-trap, for example. In the example of FIG. 1, the drain pipe 128 leads to a recapture inlet 302 of the recirculation tank 200.

In the example of FIGS. 1-5, the recapture inlet 302 is simply a hole. In some examples, the recapture inlet 302 includes a porous sieve (and/or mesh, filter, screen, etc.) configured to allow coolant to pass while prohibiting some particulate matter (e.g., debris, swarf, etc.) from passing. In the example of FIGS. 1-4, the recapture inlet 302 is formed in a removable cover 304 of a recapture reservoir 300 of the recirculation tank 200. In some examples, the recapture inlet 302 may instead be formed in a sidewall 306 of the recapture reservoir 300 and/or in some other part of the recirculation tank 200.

Figure 2:
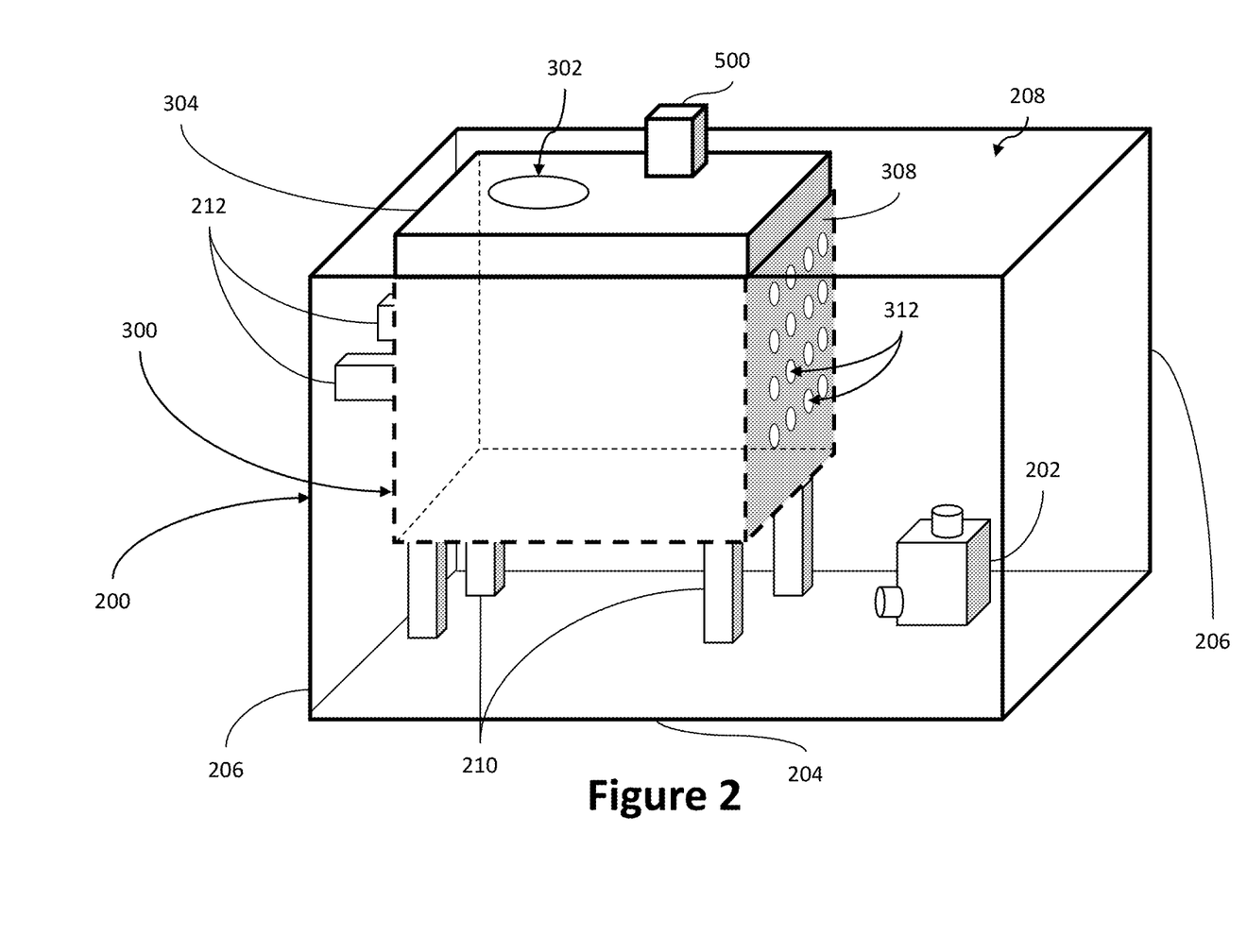
FIG. 2 shows an example recirculation tank of the material removal system of FIG. 1, in accordance with aspects of this disclosure.

In the example of FIG. 1, the recirculation tank 200 is positioned below the cabinet 104, such that the force of gravity may be sufficient to propel the coolant through the drain pipe 128 to the recirculation tank 200 and/or recapture reservoir 300. In some examples, the recirculation tank 200 and/or recapture reservoir 300 may instead be positioned above and/or to the side of the cabinet 104, and/or some other force (e.g. a pump) may propel the coolant through the drain pipe 128 from the cabinet 104 to the recirculation tank 200. In the example of FIGS. 1 and 2, the recirculation tank 200 further includes a pump 202 configured to propel recaptured coolant from the recirculation tank 200 through a conduit 130 to the cabinet inlet 122 of the cabinet 104.

FIG. 2 shows an enlarged view of the recirculation tank 200. In the examples of FIGS. 1 and 2, the recirculation tank 200 is approximately cubical. In some examples, the recirculation tank 200 may take on a variety of different shapes and sizes. In the examples of FIGS. 1 and 2, the recirculation tank 200 includes a bottom wall 204 and several sidewalls 206 connected to the bottom wall 204. The bottom wall 204 and sidewalls 206 enclose a hollow interior 208 that serves as a repository for coolant before the coolant is recirculated to the cabinet 104. In the examples of FIGS. 1 and 2, the recirculation tank 200 has an open top, through which the conduit 130 extends to bring the recirculation tank 200 in fluid communication with the cabinet inlet 122. In other examples, the recirculation tank 200 may have a closed top, and/or the conduit 130 may extend through the bottom wall 204 and/or one of the sidewalls 206.

In the examples of FIGS. 1 and 2, the recirculation tank 200 includes and/or substantially encloses a recapture reservoir 300. In some examples, the recapture reservoir 300 may be separate from the recirculation tank 200, such as positioned next to, above, and/or below the recirculation tank 200. As shown, the recapture reservoir 300 is approximately cubical, though it will be understood that in some examples the recapture reservoir 300 may take on a variety of different shapes and sizes. In the examples of FIGS. 1 and 2, the recapture reservoir 300 is in fluid communication with the cabinet 104 through the recapture inlet 302 and/or drain pipe 128. The recapture reservoir 300 is also in fluid communication with the recirculation tank 200 through a filtering surface 308 of the recapture reservoir 300.

In the example of FIGS. 1 and 2, the recapture reservoir 300 is suspended within the substantially larger recirculation tank 200. More particularly, the recapture reservoir 300 is elevated above the floor and spaced from sidewalls of the recirculation tank 200 by floor supports 210 and side supports 212. The floor supports 210 and/or side supports 212 may be attached to the recirculation tank 200 and/or the recapture reservoir 300. In some examples, the side supports 212 and/or floor supports 210 may comprise brackets, stanchions, stands, and/or other appropriate structures. In some examples, the floor supports 210 and/or side supports 212 may be removably attached to the recapture reservoir 300 (e.g., through sliding rails, snap fit receiving brackets, snap fit recesses, appropriately sized/places recesses, flanges, fasteners etc.), so as to enable easy removal of the recapture reservoir 300 from the recirculation tank 200, such as for cleaning, replacement, etc. While two side supports 212 are shown attached to one sidewall 206 of the recirculation tank 200, in some examples more or fewer side supports 212 may be attached to the recirculation tank 200, and/or that the side supports 212 may be attached to a different sidewall 206 and/or more sidewalls 206. Likewise, in some examples, more or less floor supports 210 than are shown may be used.

In the examples of FIGS. 1-3 and 5, the recapture reservoir 300 comprises an approximately cubical hollow container. As shown, the recapture reservoir 300 includes a bottom 310, a top removable cover 304, and a plurality of sidewalls 306 connecting the bottom 310 to the top cover 304. In the examples of FIGS. 1-3 and 5, the bottom 310 and at least some of the sidewalls 306 are integrally connected with one another, such that removal of the bottom 310 and/or sidewalls 306 would be difficult and/or cause a rupture (and/or breakdown, destruction, etc.) of the recapture reservoir 300. Meanwhile, the top cover 304 is removable from the recapture reservoir 300. In some examples, the top cover 304 and/or recapture reservoir 300 may include features to make securement and/or removal of the top cover 304 easier, such as complementary lips, rims, ledges, joints, pillars, recesses, protrusions, and/or flanges. In some examples, fasteners may be used to secure the top cover 304 to the recapture reservoir 300, and such fasteners may be configured for relatively simple loosening and/or removable in order to allow the top cover 304 to be removed non-destructively. In some examples, the top cover 304 may be entirely omitted.

Figure 3:
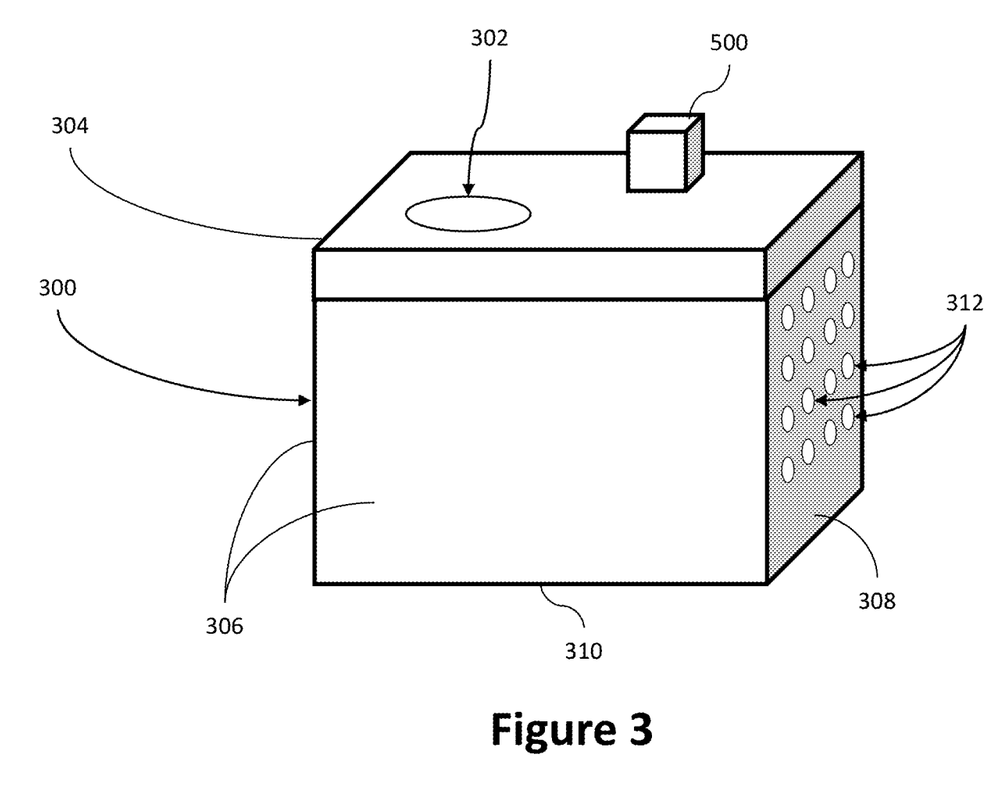
FIG. 3 shows an example recapture reservoir of the recirculation tank of FIG. 2, in accordance with aspects of this disclosure.

In the examples of FIGS. 1-2, the recapture reservoir 300 is in fluid communication with the recirculation tank 200 through a filtering surface 308. In the examples of FIGS. 1-3, the filtering surface 308 is a sidewall of the recapture reservoir 300. In some examples, the filtering surface 308 may be a different surface of the recapture reservoir 300. In some examples, the filtering surface 308 may be a removable sidewall (or some other removable surface) of the recapture reservoir 300, such as a sidewall slidably attached (e.g., via rails, tracks, and/or other appropriate mechanisms) to the other sidewalls 310, so as to allow for easy removal (e.g., for cleaning, replacement, etc.).

Figure 4:
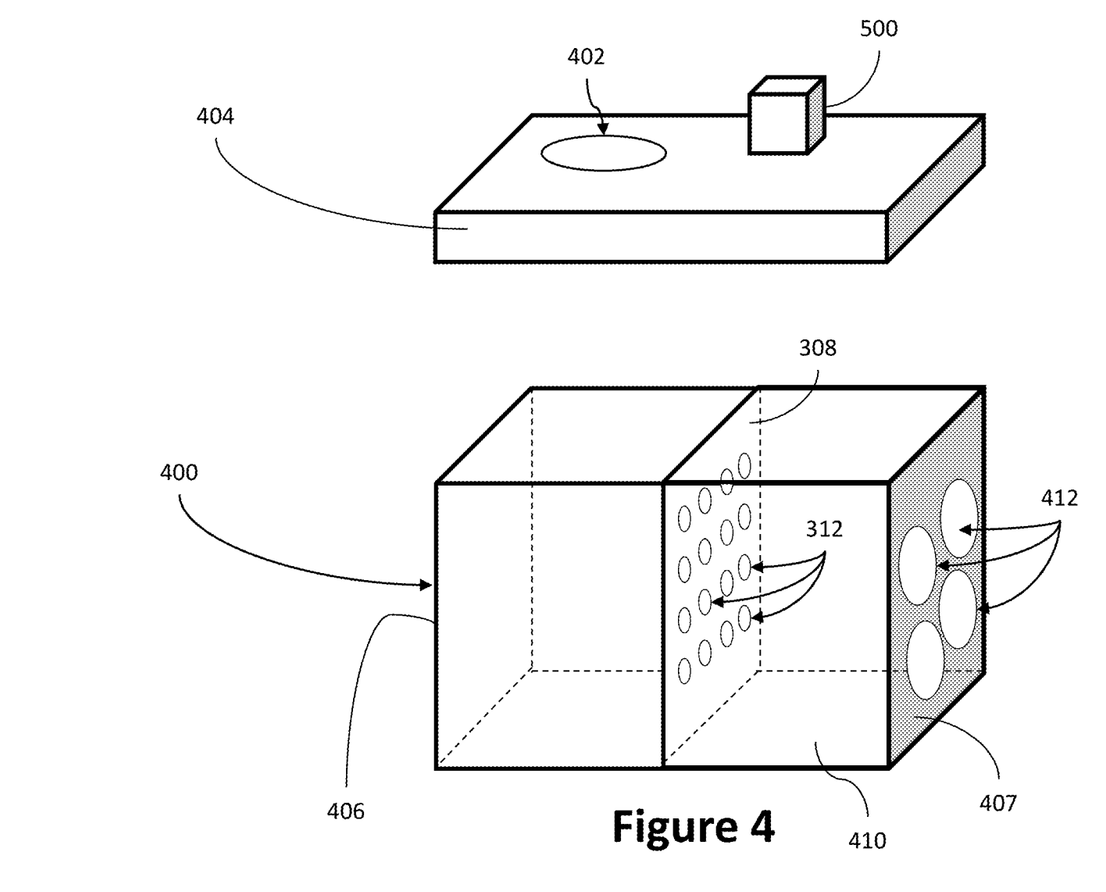
FIG. 4 shows another example recapture reservoir, in accordance with aspects of this disclosure.

FIG. 4 shows another recapture reservoir 400 where the filtering surface 308 is distinct and/or spaced from the sidewalls 406, 407. In the example of FIG. 4, the filtering surface 308 may comprise a separate, movable, and/or removable surface (e.g., a wire mesh screen). As shown, the filtering surface 308 divides the recapture reservoir 400 into two sections. While the sections are depicted as approximately equal in the example of FIG. 4, in some examples the sections may be different sizes. In the example of FIG. 4, the sidewall 407 of the recapture reservoir 400 includes openings 412 that are significantly larger than the openings 312. In FIG. 4, the openings 412 are configured to simply allow fluid flow between the recapture reservoir 400 and the recirculation tank 300, rather than being configured for filtering. In operation, fluid enters the recapture reservoir 400 in one section (farther from the sidewall 407), flows through the filtering surface 308 to the other section (closer to the sidewall 407) of the recapture reservoir 400, and then flows out of the recapture reservoir 400 through the openings 412.

As shown, the filtering surface 308 includes a plurality of openings 312. The openings 312 are sized to allow movement of coolant through the openings 312, while prohibiting movement of particulates (and/or debris, swarf, etc.) through the openings 312. The openings 312 may be smaller and/or finer than those in the sieve of the cabinet outlet 126, such that the filtering surface 308 will prohibit passage of particulate matter that the cabinet outlet 126 allowed through. While the openings 312 are depicted in FIGS. 1-6 as somewhat sizable, for the sake of understanding, in actual implementation, the openings 312 may be much smaller. While the openings 312 are depicted as circular in FIGS. 1-6, in some examples, the openings 312 may be of different shapes. In the example of FIG. 1-6, the lowermost openings 312 are elevated above the bottom 310 (and/or lower surface) of the recapture reservoir 300 (and/or the bottom wall 604 of the recirculation tank 600), which may allow some space for particulates and/or coolant to build up (and/or be compacted) within the recapture reservoir 300 before encountering the openings 312. In some examples, the openings 312 may be elevated further. In some examples, the elevation may be removed, and the openings 312 may extend all the way to the bottom of the recapture reservoir 300 (and/or recirculation tank 600).

Figure 5:
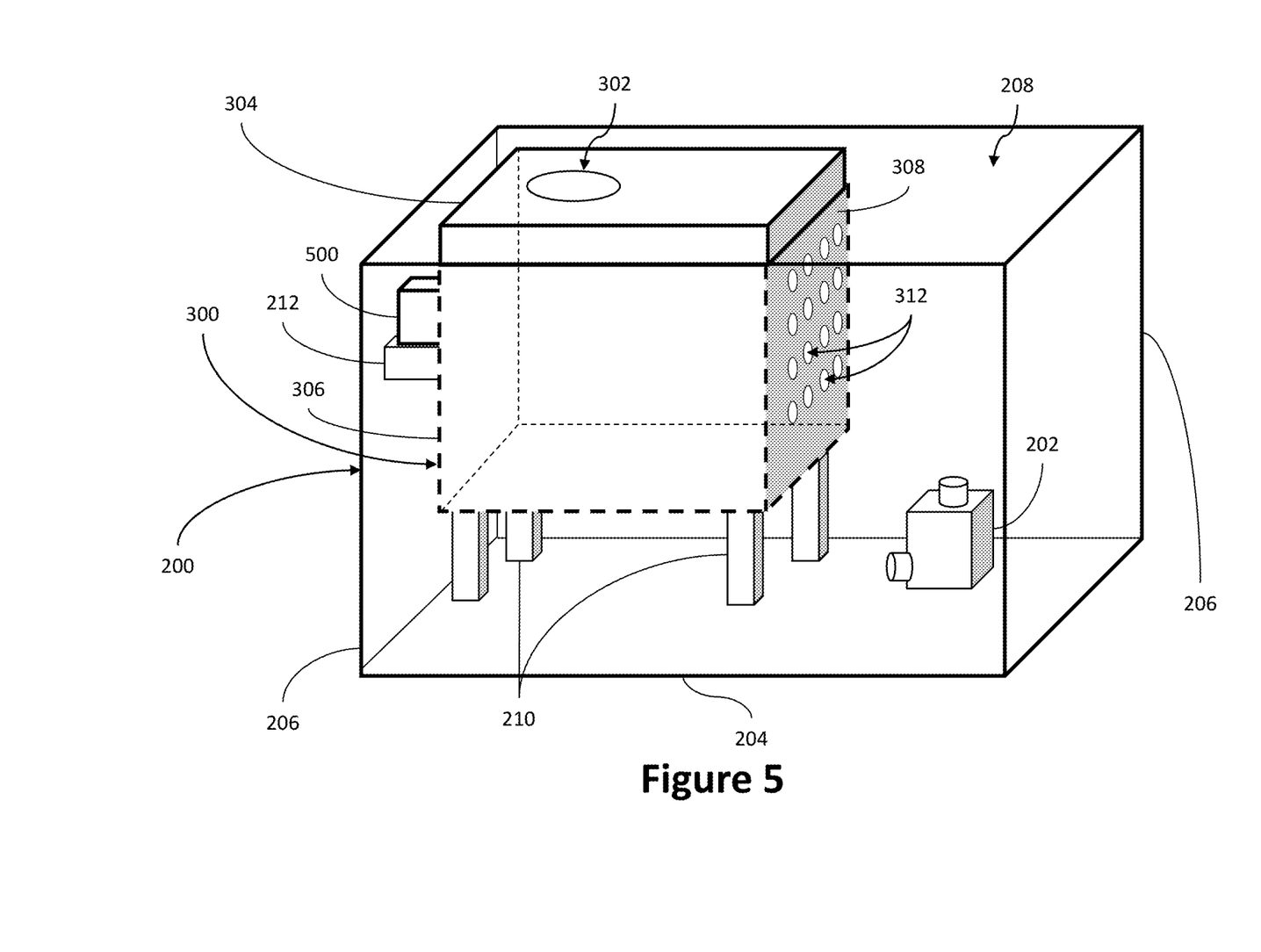
FIG. 5 shows another example recirculation tank, in accordance with aspects of this disclosure.

In the examples of FIGS. 1-4, a vibration device 500 (e.g., a vibration motor) is in contact with the recapture reservoir 300. In the examples of FIGS. 1-4, the vibration device is in contact with the removable cover 304 of the recapture reservoir 300. In the example of FIG. 5, the vibration device 500 is contact with and/or attached to a side support 212, which will communicate the vibration to the sidewall 306 of the recapture reservoir 300 (which will communicate the vibration to the filtering surface 308). In some examples, the vibration device 500 may be in direct contact with and/or attached to the sidewall 306, the filtering surface 308, a different sidewall 306, and/or the bottom wall 310 of the recapture reservoir 300, and/or with one or more floor supports 210. In some examples, a dampening barrier (e.g. a foam insulation barrier) may be placed between the vibration device 500 and the recirculation tank 200 in order to limit the vibrations of the vibrations device 500 from reaching the recirculation tank 200 via the support structures 210, 212 of the recapture reservoir 300. In some examples, a dampening barrier (e.g. a foam insulation, rubber, silicone, or other energy dissipating material) may be placed between the recapture reservoir 300 and the floor supports 210, side supports 212, and/or recirculation tank 200 in order to isolate and/or decouple the recapture reservoir from the floor supports 210, side supports 212, and/or recirculation tank 200. Such isolation and/or decoupling may help to reduce noise generated when vibrations are communicated between surfaces. While the coolant may experience some vibration, the coolant may also damp the vibration and provide vibration insulation between the supports 210, 212, recapture reservoir 300, and/or recirculation tank 200.

The vibration device 500 may be an electrically powered device. The vibration device 500 may receive electrical power from a power source (now shown) of the material removal system 100 and/or material removal machine 102. In some examples, the vibration device 500 may receive electrical power from a local power source (e.g., batteries). The vibration device 500 may be a direct current electrical motor having an offset weight attached to a shaft of the motor, such that rotation of the shaft causes rotation of the weight. As the weight is offset from an axis of rotation of the shaft, the weight may produce vibrations (and/or shaking, tremors, oscillations, reverberations, etc.). Vibrations produced by the vibration device 500 may be transferred and/or communicated to the recapture reservoir 300 and/or filtering surface 308. These vibrations may help to dislodge particulates that may otherwise block (and/or obstruct, clog, etc.) the openings 312.

The vibrations may also help to settle and/or compact particulate matter into a bottom portion of the recapture reservoir 300, which may further improve throughput of the filtering surface 308 and/or make cleaning of the recapture reservoir 300 easier and/or more efficient. In use, it was observed that the vibrations of the vibration device 500 (that were intended to help keep the openings 312 of the filtering surface 308 unobstructed) unexpectedly assisted in settling and/or compacting the filtered particulates in the bottom of the recapture reservoir 300. This settling and/or compacting helps to reduce the amount of particulates floating in the coolant that may attempt to flow through the filtering surface 308, which also reduces clogging. The settling and/or compacting further improves throughput of the filtering surface 308 and/or makes cleaning of the recapture reservoir 300 easier. In operation, coolant may be sprayed from the nozzles 118 of the material removal system 100 in order to cool and/or clean the material removal machine 102 and/or interior of the cabinet 104. The coolant may then flow through the cabinet outlet 126, along with some particulate matter that may have been captured and/or washed away by the coolant. The sieved cabinet outlet 126 may stop some of the larger particular matter from flowing through the cabinet outlet 126, so as to stop dislodged, loose, and/or freed components of the material removal system 100, for example, from being accidentally washed away. The coolant and/or any coolant captured particulate matter that flows through the cabinet outlet 126 may flow through the drain pipe 128 to the recapture reservoir 300 through the inlet 302.

Once in the recapture reservoir 300, the coolant may flow through the openings 312 of the filtering surface 308. The filtering surface 308 may prohibit particulate matter that attempts to flow through the openings 312. The vibration device 500 may impart vibrations to the recapture reservoir 300 and/or filtering surface 308 to dislodge any particulates that become stuck in and/or clog the openings 312, so as to prevent obstruction and ensure continuous flow and/or filtering of coolant through the filtering surface. After passing through the filtering surface 308, the coolant may flow into the recirculation tank 200, where the coolant may be recirculated to the cabinet inlet via the pump 202. Once recirculated to the cabinet inlet 122, the coolant may flow to the nozzles 118 via the tube 124, hose inlet 120, and/or hoses 114, and once again be sprayed from the nozzles 118 to repeat the process.

At some point, an operator may wish to clean and/or replace the filtering surface 308 and/or recapture reservoir 300. For a quick cleaning, the operator may take off the removable cover 304 and scoop out and/or otherwise remove any particulate matter that has been retained within the recapture reservoir 300. In some examples, some or all of the interior of the recapture reservoir 300 may be lined with a porous material (e.g., having pores sizes similar to those of the openings 312), such that an operator may quickly remove any filtered particulate matter by removing the porous material. In some examples, the filtering surface 308 may comprise such a removable porous material. In some examples, the operator may alternatively (or additionally) remove the filtering surface 308 and/or the entire recapture reservoir 300 for cleaning and/or replacement. Once the replaceable cover 304, filtering surface 308, and/or recapture reservoir 300 have been properly cleaned and/or replaced, operation may begin anew.

Figure 6:
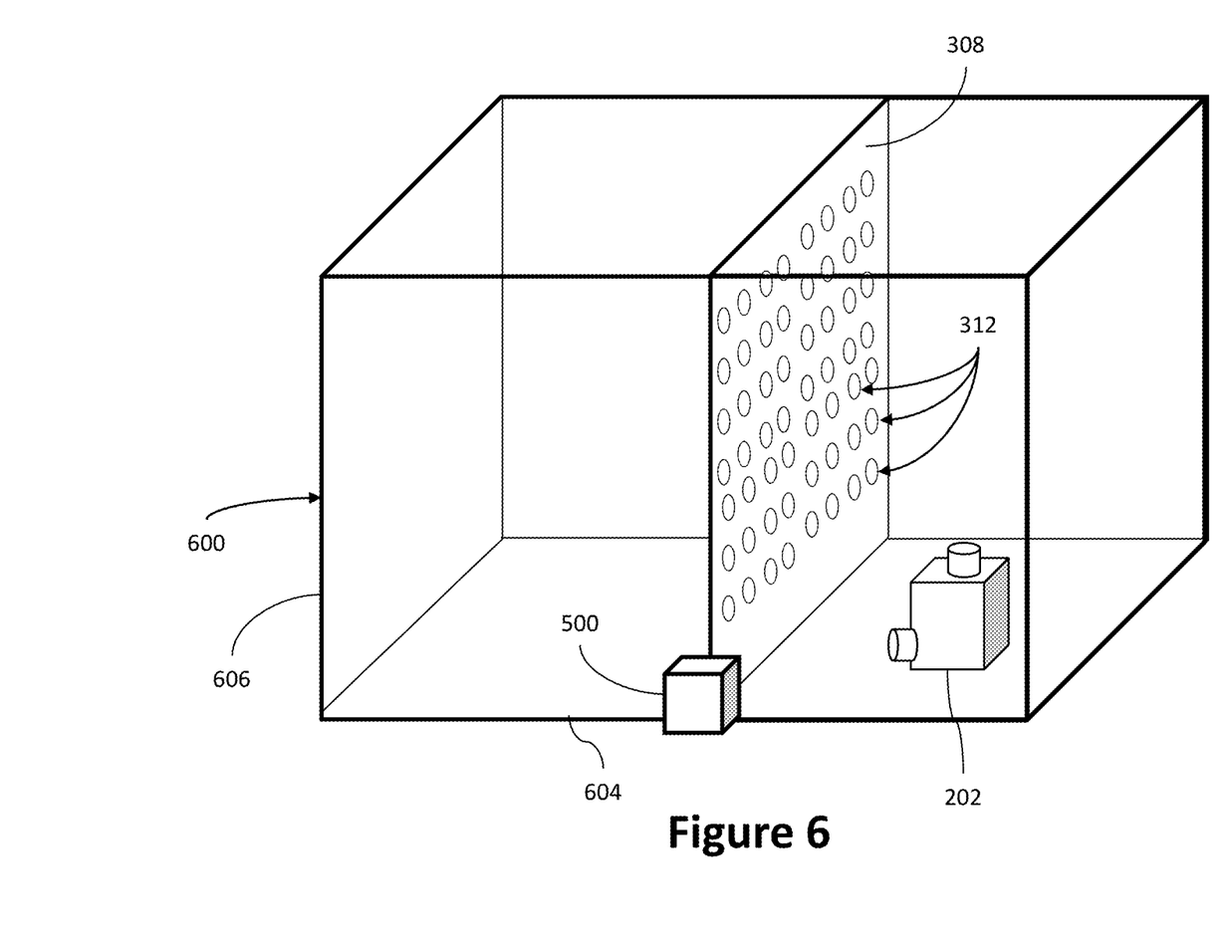
FIG. 6 shows another example recirculation tank, in accordance with aspects of this disclosure.

FIG. 6 shows another example recirculation tank 600. As shown, the recirculation tank 600 includes no recapture reservoir 300, 400, but still includes a filtering surface 308 and a vibration device 500 in contact with the recirculation tank 600. While the vibration device 500 is shown in contact with the recirculation tank 600 proximate the bottom wall 604 and/or filtering surface 308, in some examples, the vibration device 500 may be positioned differently. In the example of FIG. 6, the filtering surface 308 divides the recirculation tank 600 into two sections, a section with the pump 202, and a section without the pump 202. While the sections are shown as approximately equal in the example of FIG. 6, in some examples, the sections may be of different sizes. In some examples, the recirculation tank 600 is positioned such that the section that does not have the pump 202 is in fluid communication with the drain pipe 128. Thus, fluid will flow into the recirculation tank 600 from the cabinet 106 via the drain pipe 128, through the filtering surface 308, and then back to the cabinet 106 via the pump 202. Vibrations from the vibration device 500 will help to keep the filtering surface 308 free from obstruction and increase compaction of filtered particulates within the recirculation tank 600.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A material removal system, comprising:
    a material removal cabinet housing a material removal machine, the material removal cabinet having a cabinet inlet and a cabinet outlet; and
    a recirculation system in fluid communication with the cabinet inlet and cabinet outlet, the recirculation system, comprising:
        a recirculation tank,
        a recapture reservoir in fluid communication with the recirculation tank, the recapture reservoir comprising
            a liquid container having a liquid impermeable bottom wall,
            at least one liquid impermeable sidewall connected to the liquid impermeable bottom wall, and
            a liquid permeable sidewall connected to the liquid impermeable bottom wall and the at least one liquid impermeable sidewall, and
        a vibration device in contact with at least a portion of the recirculation system.

2. The material removal system of claim 1, wherein the liquid permeable wall comprises a filtering surface having openings sized to filter fluid flowing between the recapture reservoir and the recirculation tank within the recirculation system.

3. The material removal system of claim 1, wherein the recirculation tank is in fluid communication with the cabinet inlet, and the recapture reservoir is in fluid communication with the cabinet outlet and the recirculation tank.

4. The material removal system of claim 1, wherein the material removal machine comprises a saw, a polisher, or a grinder.

5. The material removal system of claim 1, wherein the recapture reservoir is positioned at least partly within the recirculation tank.

6. The material removal system of claim 1, the recapture reservoir further including a removable cover having an opening aligned with a drain pipe connected to the cabinet outlet of the material removal cabinet.

7. The material removal system of claim 1, wherein the liquid permeable sidewall is removably connected to the liquid impermeable bottom wall and the at least one liquid impermeable sidewall.

8. A recirculation apparatus, comprising:
    a recirculation tank in fluid communication with a cabinet inlet and a cabinet outlet of a material removal cabinet that houses a material removal machine;
    a recapture reservoir in fluid communication with the recirculation tank, the recapture reservoir comprising:
        a liquid container having
            a liquid impermeable bottom wall,
            at least one liquid impermeable sidewall connected to the liquid impermeable bottom wall, and
            a liquid permeable sidewall connected to the liquid impermeable bottom wall and the at least one liquid impermeable sidewall, the liquid permeable sidewall comprising a filtering surface having openings sized to filter fluid communicated between the recapture reservoir and the recirculation tank, and to prohibit passage of particulates between the recapture reservoir and the recirculation tank; and
    a vibration device in contact with the recapture reservoir.

9. The recirculation apparatus of claim 8, the recapture reservoir further including a removable cover having an opening aligned with a drain pipe connected to the cabinet outlet of the material removal cabinet.

10. The recirculation apparatus of claim 8, wherein the recapture reservoir is positioned at least partly within the recirculation tank, and the recirculation tank has an open top such that the recapture reservoir can extend out of the recirculation tank through the open top.

11. The recirculation apparatus of claim 8, wherein the liquid permeable sidewall is removably connected to the liquid impermeable bottom wall.

12. The recirculation apparatus of claim 8, wherein the liquid permeable sidewall is removably connected to the at least one liquid impermeable sidewall.

13. The recirculation apparatus of claim 8, further comprising a support connecting the recapture reservoir to the recirculation tank, wherein the support separates the recapture reservoir from the recirculation tank, such that none of the liquid permeable sidewall, liquid impermeable bottom wall, or at least one liquid impermeable sidewall of the recapture reservoir contact the recirculation tank.

14. The recirculation apparatus of claim 13, further comprising a dampener positioned between the support and the recapture reservoir, the dampener being able to reduce noise created by vibrations communicated between the support and the recapture reservoir.

* * * * *